United States Patent [19]
Surbrook et al.

[11] Patent Number: 5,662,337
[45] Date of Patent: *Sep. 2, 1997

[54] ONE PIECE GASKET FOR COMPLEX OIL PAN CONFIGURATION

[75] Inventors: Melvin L. Surbrook, Jefferson City, Tenn.; Thomas D. Gacioch, Riverview, Mich.

[73] Assignee: Indian Head Industries, Inc., Charlotte, N.C.

[*] Notice: The term of this patent shall not extend beyond the expiration date of Pat. No. 5,536,023.

[21] Appl. No.: 683,573

[22] Filed: Jul. 15, 1996

Related U.S. Application Data

[63] Continuation of Ser. No. 332,484, Oct. 31, 1994, Pat. No. 5,536,023.

[51] Int. Cl.$^6$ ........................................ F16J 15/00
[52] U.S. Cl. ............................ 277/235 B; 277/207 R
[58] Field of Search ..................... 277/11, 180, 208, 277/235 B, DIG. 10, 211, 207 R, 166

[56] References Cited

U.S. PATENT DOCUMENTS 4,535,996   8/1985   Cardis et al. .

FOREIGN PATENT DOCUMENTS 3831413   4/1990   Germany .
1541690   5/1977   United Kingdom .

*Primary Examiner*—Daniel G. DePumpo
*Attorney, Agent, or Firm*—Howard & Howard

[57] ABSTRACT

An improved gasket is designed for use on a complex interface surface between an oil pan and an engine. The gasket is formed as a one-piece molded part and is preferably injection molded from a silicone rubber. The gasket incorporates crush limiters at each bolt hole, and dual spaced sealing beads along the sides, with a circular sealing bead surrounding each bolt hole. The crush limiters control the amount of tightening of the bolts, while the sealing beads accommodate warpage of the oil pan, or undertightening of the bolt. In other features, tabs are disposed on each side of the gasket to accommodate an oil dip stick. The user of the gasket merely removes a cutaway portion associated with one of the tabs to provide a space for passage of the oil dip stick on the appropriate side. In this way, a single gasket can be incorporated into engine configurations having dip sticks on either side. In addition, an end tab is formed on one end of the gasket, and provides a saddle to be positioned outwardly of the engine to properly position the gasket.

2 Claims, 2 Drawing Sheets

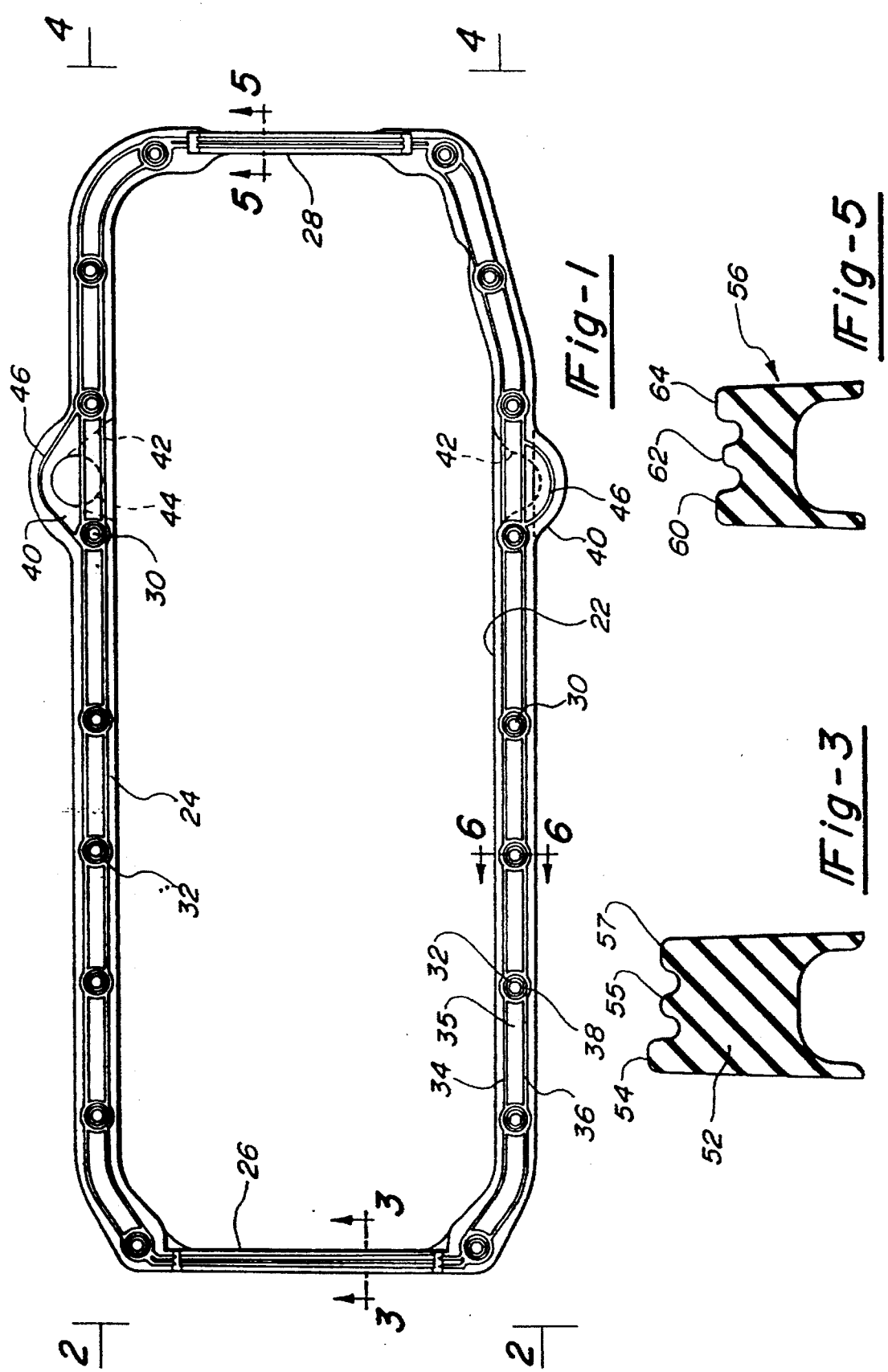

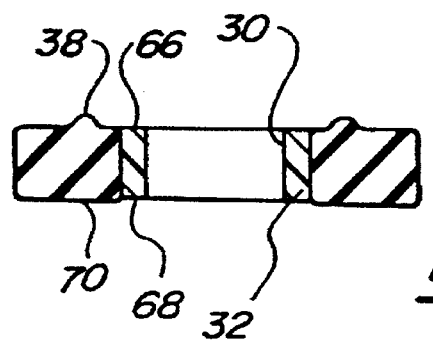
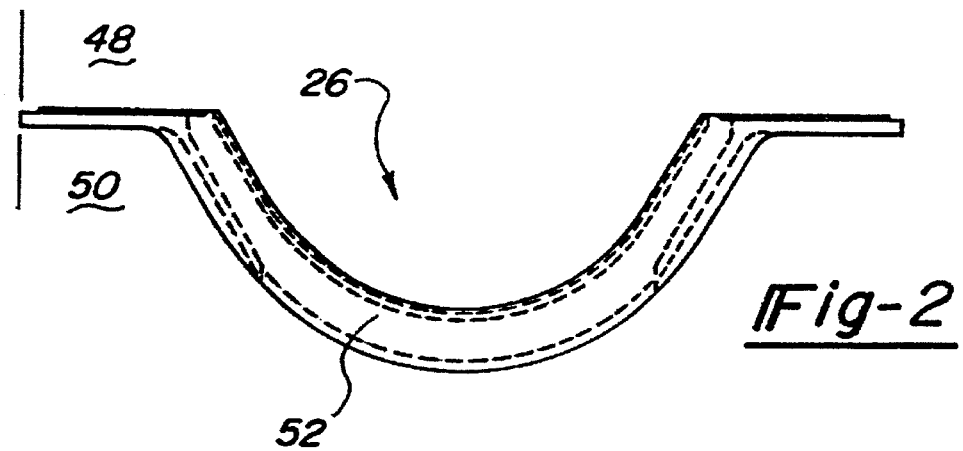
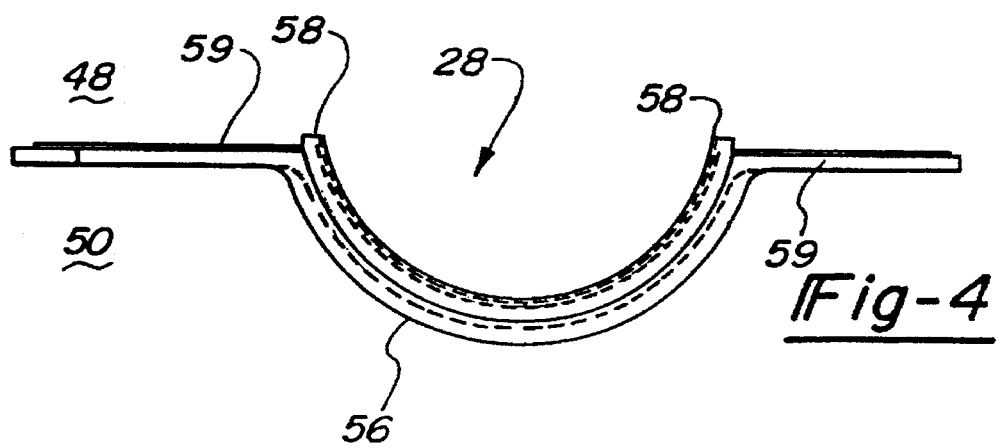

ONE PIECE GASKET FOR COMPLEX OIL PAN CONFIGURATION

This is a continuation of application(s) Ser. No. 08/322,484 filed on Oct. 31, 1994 now U.S. Pat. No. 5,536,023.

BACKGROUND OF THE INVENTION

This invention relates to a one piece molded gasket which is configured to seal between an oil pan and an engine, and provide versatility in the types of engines in which the gasket may be used.

In the prior art, oil pan gaskets have been formed of a one-piece construction. Such one-piece molded constructions, however, have typically been for more recent engine designs. In the mid-1980's, the engine and oil pan interfaces were redesigned to simplify the mating surfaces, and facilitate the use of a one-piece gasket. Prior to that time, multi-piece gaskets were required to properly seal on the complex interface surfaces between the oil pan and the gasket. A one-piece gasket design that could seal on the prior complex engine configurations has not yet been provided.

In addition when supplying gaskets for after-market use on older vehicles, it would be desirable to allow the gasket to be modified for use on various types of engines. In at least one model, between different model years, the location of the oil dip stick has changed from one side of the engine to the other. In the prior art, separate gaskets have been required for each of the oil dip stick locations. It would be desirable to provide a gasket which could incorporate the dip stick on either side. On the other hand, the alternate accommodation of an oil dip stick on either side increases the complexity of the sealing surfaces, and thus makes the provision of the one-piece gasket even more difficult.

SUMMARY OF THE INVENTION

In a disclosed embodiment of this invention, a one-piece molded gasket is provided to seal upon a complex interface surface between an oil pan and an engine as were typically provided in older vehicles. The gasket includes a pair of spaced sealing beads extending along the long sides of the gasket which accommodate any warpage or bending of the oil pan relative to the engine. In addition, the beads compensate for under-tightening of the bolts. In combination with the sealing beads, the bolt holes incorporate crush limiters, which are essentially steel bushings preventing overtightening of the bolts. An operator is thus provided feedback of a properly tightened bolt, by simply tightening the bolt until it contacts the crush limiter. The crush limiter preferably does not extend to the full height of the sealing bead, and a circular sealing bead portion preferably extends around each crush limiter. In this way, the circular sealing bead compensates for misapplication of tightening torque at the bolt.

In other features of this invention, each long side of the gasket incorporates a tab designed to receive an oil dipstick. Each tab preferably includes a cut-away portion, or alternatively a pattern instructing an operator where to cut to incorporate the dip stick on that side. Thus, an operator may merely tailor the gasket by removing the appropriate tab portion for the side that is to receive the dip stick. At the same time, at least one sealing bead is disposed on the tab outwardly of the removed portion, to insure an adequate seal at the location of the oil dip stick.

In other features of this invention, the crush limiter does not extend beyond the face of the gasket which does not include the beads, such that some accommodation is provided for warpage or improper tightening of the bolts.

Also, an end tab is preferably associated with one end of the gasket to provide a saddle properly positioning the gasket adjacent an end face of the engine. In this way, an operator may easily properly position the gasket relative to the oil pan and engine, as it is being mounted.

In the most preferred embodiment of this invention, the gasket is formed of a known rubber gasket material, and in a most preferred embodiment, a silicone rubber.

These and other features of the present invention can best be understood from the following specification and drawings, of which the following is a brief description.

BRIEF DESCRIPTION OF THE DRAWINGS

FIG. 1 is a plan view of a gasket according to the present invention.

FIG. 2 is an end view of a first end of the gasket shown in FIG. 1 along line 2—2.

FIG. 3 is a cross-sectional view along line 3—3 as shown in FIG. 1.

FIG. 4 is an end view of an opposed end of the gasket along line 4—4 as shown in FIG. 1.

FIG. 5 is a cross-sectional view along with line 5—5 as shown in FIG. 1.

FIG. 6 is a cross-sectional view along line 6—6 as shown in FIG. 1.

DETAILED DESCRIPTION OF A PREFERRED EMBODIMENT

An inventive gasket 20 is illustrated in FIG. 1. Gasket 20 incorporates two opposed long sides 22 and 24, a front end 26 and a rear end 28. The gasket 20 is configured to seal an interface surface between an oil pan and an engine, and is most preferably configured to fit such an interface in vehicles manufactured prior to the mid-1980's. Bolt holes 30 are spaced generally along the sides 22 and 24, and each incorporate a steel crush limiter 32. Sealing beads 34 and 36 extend along the sides 22 and 24, and a space 35 is formed between the beads 34 and 36. The relative height of the beads to the space 35 is clear from FIG. 6. As shown, beads 34 and 36 extend slightly away from the nominal surface of the gasket 20. In addition, circular bead portions 38 surround each bolt hole 30.

In a main feature of this invention, tabs 40 are provided on each side 22 and 24 to accommodate an oil dip stick. In older vehicles, the location of the dip stick has sometimes been on one side, and sometimes on the other. Thus, in the prior art, different gaskets have necessarily been tailored for each dip stick option. The present invention allows an operator to tailor a single gasket to accommodate either dip stick location. As shown in FIG. 1, tabs 40 incorporate an indicia, such as a template, cut away notched pattern, or simply a line indicating where a dip stick cut away portion 42 should be removed. As shown, the oil dip stick requires an opening such as is shown in phantom at 44 associated with side 22. The operator must merely determine which side 22 or 24 is to receive the oil dip stick, and then merely remove the cut away portion 42 on the appropriate side. Note that the cutaway portion 42 does not extend outwardly as far as an outermost sealing bead 46. Thus, proper sealing is still insured even at the location of the dip stick. The unused tab might cause sealing problems in some applications, if it were not for the use of the sealing beads 34 and 36 which remain at the unused tab 40. Thus, no seating problems should occur. Note also that there are a pair of bolt holes spaced adjacent to each tab 40 such that the area around the non-used tab will still be properly sealed.

A front end 26 and rear end 28 connect the sides 22 and 24. The gasket 20 is preferably formed as a one-piece molded part, that is preferably injection molded from a suitable known material. In a preferred embodiment, a silicone rubber was utilized. Alternatively, impression or other molding techniques could be used.

FIG. 2 shows front end 26 which is received between the engine 48 and the oil pan 50, both of which are shown highly schematically. There is a curved portion 52 on end 26 to accommodate the crank shaft area of the interface between engine 48 and oil pan 50.

As shown in FIG. 3, curved portion 52 of end 26 includes three beads 54, 55 and 57 at an upper surface. Beads 54, 55 and 57 perform a sealing function, similar to the beads 34 and 36.

FIG. 4 shows the rear end 28, which also incorporates a curved portion 56 to accommodate the crank shaft area of the interface between engine 48 and oil pan 50. An end tab 58 extends beyond gasket 20 at end 28. Tab 58 extends for only a small width, and does not extend beyond the circumferential extents of curved portion 56. That is, it does not extend into the flat portions 59 on each side of curved portion 56. End tab 58 is a positioning member, and sits outwardly of the end face of engine 48. In a sense, end tab 58 is a saddle, facilitating the positioning of gasket 20 on the engine 48 as it is being attached. The end tab 58 preferably extends beneath a surface 57 of gasket 20 for an extent that is greater than one half the overall thickness of the gasket 20. In one specific example, the thickness of the gasket at the side locations 59 was 0.152 inches, while the tab extended 0.130 inches beyond the remainder of gasket 20. Again, the tab provides easy positioning of the gasket relative to the engine.

As shown in FIG. 5, curved portion 56 incorporates three sealing beads 60, 62 and 64. The sealing beads provides the sealing function as has been described previously.

FIG. 6 is a cross section along lines 6—6 as shown in FIG. 1. As shown, crush limiter 32 is associated with the bolt hole 30. Crush limiter 32 is preferably formed of a metal, and most preferably of a steel. Crush limiter 32 prevents undue tightening of a bolt in bolt hole 32. As shown, the circular sealing bead portion 38 surrounds bolt hole 30, and extends beyond the nominal face of the gasket 20 for an amount that is greater than the extent of the first end 66 of crush limiter 32. In this way, should the bolt and bolt hole 30 not be fully tightened, the sealing bead 38 still insures there is adequate sealing. A similar function is provided by extending the opposed face 70 of gasket 20 beyond the second end 68 of crush limiter 30.

Although a preferred embodiment of this invention has been disclosed, a worker of ordinary skill in the art would recognize that certain modifications would come within the scope of this invention. For that reason, the following claims should be studied to determine the true scope and content of this invention.

We claim:

1. An oil pan gasket comprising:

a one-piece body including two sides and two ends, each of said ends having a central curved portion curving away from a nominal flat surface of said body, said sides being formed with a plurality of bolt holes to receive bolts to attach an oil pan to an engine;

each of said sides being formed with structure to accommodate an oil dipstick, said structure including a first sealing bead portion positioned radially outwardly of an area which is to accommodate an oil dipstick, such that said first sealing portion will seal on a side of said oil pan gasket which actually receives an oil dipstick, and a second sealing portion positioned radially inwardly to seal on the side of said oil pan gasket which does not receive an oil dipstick.

2. An oil pan gasket as recited in claim 1, wherein sealing beads extend generally along the entire length of said side, and said second sealing portion extending generally as a linear extension of the remainder of at least one of said sealing beads which extends along said side.

\* \* \* \* \*